Oct. 2, 1934. P. J. WERBER ET AL 1,975,241
DRINKING VESSEL
Filed April 24, 1933
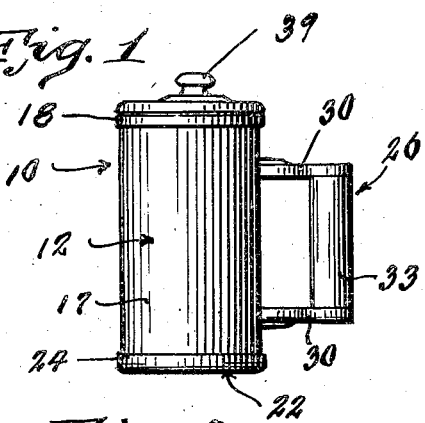
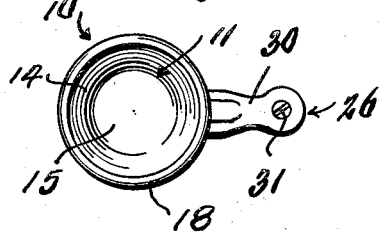
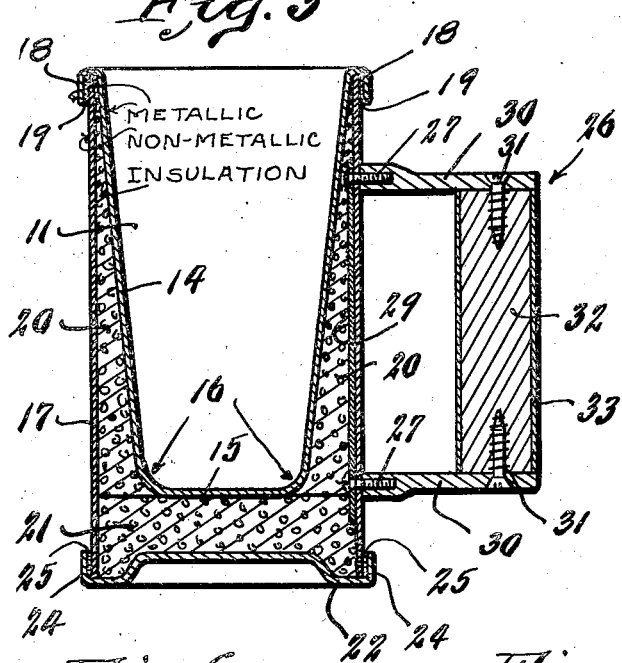
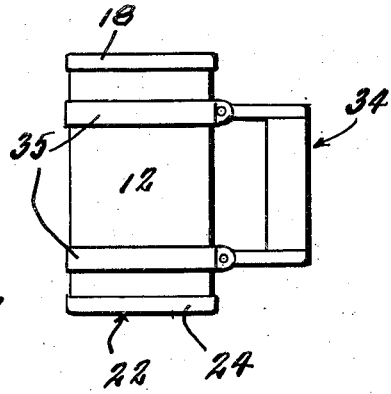
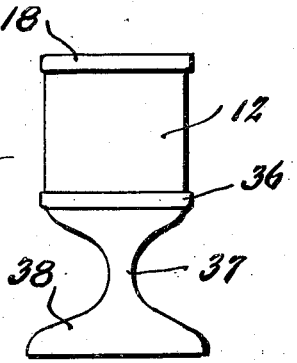
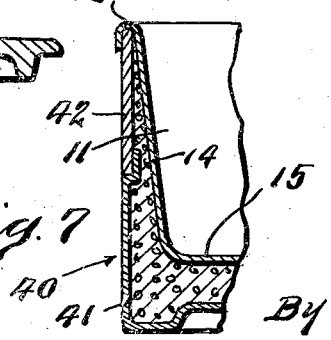
Inventors
Phil J. Werber
John C. Sampson
By William James Atty.

Patented Oct. 2, 1934

1,975,241

UNITED STATES PATENT OFFICE 1,975,241

DRINKING VESSEL

Phil J. Werber and John C. Sampson, St. Louis, Mo., assignors of one-half to Frank E. Terrio, Webster Groves, Mo.

Application April 24, 1933, Serial No. 667,622

4 Claims. (Cl. 65—66)

This invention relates to new and useful improvements in drinking vessels.

In serving cold or hot beverages, it is desirable to maintain the beverage at the required temperature when set on the table before the consumer. In serving ice-cold beverages, such as beer, the container, which may be a glass, a stein or the like, has to be chilled before using and has to be replaced after each use since it absorbs heat and becomes warm and renders the beverage warm and flat. Furthermore, condensation takes place on the exterior of such vessel and renders the table on which it stands damp and unpleasant in appearance. The glasses or steins are heavy and are liable to break, while copper mugs and the like require constant polishing and cleaning.

One of the main objects of the invention is the provision of a drinking vessel having insulated walls thereby maintaining the beverage contained therein at its proper temperature for a long period of time without requiring replacing or chilling of the vessel after each use and without causing condensation on the surface of the vessel.

Another object of the invention is to provide a drinking vessel having insulated walls to preserve the original temperature of the beverage, said vessel being so constructed that it is light in weight, is practically indestructible, and can be readily cleaned.

Further objects of the invention are to provide a drinking vessel having an inner member or cup and having an outer shell member, said members being held in spaced relation with each other and the space therebetween being filled with suitable insulating material to prevent transmission of heat between said members.

Still further objects of the invention are to provide a drinking vessel for ice-cold beverages, such as beer, comprising an inner or cup member formed of a single piece of metal and enclosed by an outer or shell member formed of formica, hard rubber, fiber, or other heat insulating material, the upper end of said inner member being turned outwardly and downwardly to fit over the upper edge of said shell member and form a metallic rim for the vessel whereby the coolness of the inner member is imparted to the lips of the drinker, the space between said members being filled with suitable insulating material and the lower end of said shell member being closed and insulated from the lower end of said inner member.

Additional objects of the invention are to improve upon drinking vessels of the class described whereby the inner member can be formed of metal and the outer member of comparatively thin heat non-absorbent material which can be suitably decorated and given any desired finish.

With these and other objects in view, our invention consists in certain novel features of construction and arrangement of parts, hereinafter more fully described and claimed, and illustrated in the accompanying drawing, in which—

Figure 1 is a side elevational view of our improved drinking vessel.

Figure 2 is a top plan view of same.

Figure 3 is an enlarged vertical cross section of same.

Figure 4 is a detail view showing a modified form of our invention.

Figure 5 is a detail view showing another modified form of our invention.

Figure 6 is a vertical cross section of a cover shown in Figure 1.

Figure 7 is a cross sectional detail view showing another modified form.

Referring by numerals to the accompanying drawing, 10 indicates a drinking vessel which, in the instant case, is in the shape of a beer mug or stein. This stein consists of an inner or cup member 11 and an outer shell or tubular member 12. As shown in the drawing, the outer member 12 is of uniform diameter throughout its entire length while the inner member 11 is tapered downwardly as indicated at 14 and is closed by a bottom 15 formed integral therewith and having rounded corners, as indicated at 16. The outer member 12 consists of an open-ended tubular piece 17 of suitable thickness. This member can be of any desired color and has a smooth surface which is not easily marred or scratched and is not affected by air or water.

A rim 18 which is preferably formed integral with the inner member 11 is bent outwardly and downwardly and fits over the edge of the upper end of shell member 12. Preferably it is secured in position by swaging and cement can be used to insure a water-tight seal, as indicated at 19. The rim 18, being formed integral with inner member 11, is chilled by the ice-cold contents of the latter and imparts coolness to the drinker's lips when the vessel is used. The space between members 11 and 12 is filled with suitable insulating material 20.

This insulating material can be either in granular form or it can be pressed into proper shape and inserted in place between the members.

Where granular material is used, as in the instant case, a disk 21 of pressed cork material is used to close the lower end of member 12 and engage the bottom of the inner member 11. A bottom piece or base 22 is secured in position by means of annular flange 24 which fits over and encloses the lower end of outer member 12 and holds the insulation material 20 in place. Preferably this flange 24 is swaged over the edge of said outer member. A cement may be used to form a water-proof seal, as indicated at 25.

Where a handle 26 is used, it is secured to the outer member 12 by means of screws 27, the heads of which are located within member 12 and which screws extend outwardly through apertures in said tubular member and are screw-seated in the ends of said handle, as indicated at 28. Preferably, a sheet of metal 29 is arranged vertically against the inner side of member 12 to receive the heads of screws 27 and said metal piece is provided with apertures coinciding with the apertures in member 12. This metal piece serves to reinforce said tubular member at the points where the handle is attached thereto. The handle may be of any desired construction. As shown in the drawing, it consists of ends 30 which are attached by screws 31 to the ends of a core 32. This core may be of wood and is covered with a thin tubular member 33 formed of formica or other suitable material.

In the modified form shown in Figure 4, each end of handle 34 is attached to a band 35 which is located exteriorly of and encircles the outer member 12, thereby attaching the handle thereto.

In the modified form shown in Figure 5, the bottom piece 36 has attached thereto a stem 37 which terminates in a base 38, the handle being dispensed with.

A cover 39, such as shown in Figure 6, can be used to close the beer mug. This cover fits over rim 18 and is preferably formed of heat non-absorbing material so as to reduce the metal surface to minimum.

The modified form shown in Figure 7 has the outer member 40 formed of two pieces, namely, lower piece 41 and upper piece 42. The lower piece is formed of metal and may have the bottom formed integral with it. The upper end of said lower piece 41 is secured in any suitable manner to the lower end of upper piece 42. The latter is formed of heat non-absorbing material and breaks the connection between the lower piece 41 and the inner member 11. The upper end of piece 42 is secured in the usual manner to the rim of the inner or cup member.

The insulation material disposed within the insulating chamber between the inner and outer members prevents the transmission of heat to the inner member so that the content thereof remains cold for a long time. It is desirable to form the rim 18 integral with the inner member 11 in order to impart to said rim coolness produced in said inner member by the ice-cold beverage contained in the latter. The inner member can be made of aluminum, copper or other metal, and it can be finished or plated as desired. Thus it can be chromium-plated, tinned or silver-plated. The joints between the metal parts and the tubular member 12 are rendered water-proof so as to prevent water from entering the insulating chamber.

Our improved container possesses the advantages of a metal drinking cup without having the objectionable features of an ordinary copper mug as in our container the cup does not absorb temperature from the room but, due to its insulation, remains cold over a long period of time.

While our improved drinking container is primarily intended for use with cold beverages, it can be equally as well used to contain coffee, tea, and other hot drinks as it will keep them at proper temperatures for a long period of time.

While we have shown and described a preferred embodiment of our invention, it is obvious that various changes in the construction of our drinking vessel can be made without departing from the spirit of our invention.

We claim:

1. A drinking vessel of the class described comprising an inner cup member of metal having its upper end terminating in an outwardly and downwardly disposed rim, an outer tubular member of heat non-conducting material, said member being open at both ends and having its upper end secured within said rim, insulating material arranged in the space formed by said members, a bottom secured to the lower end of said outer member and confining said insulating material in place, and a handle secured to said tubular outer member.

2. A drinking vessel of the class described comprising an inner cup member of metal having its upper end formed with an outwardly and downwardly presented rim, an outer open-ended tubular member of heat non-conducting material enclosing said cup member and having its upper end disposed within said rim, said outer member being of comparatively large diameter to provide an annular space between said members, a bottom member having an upwardly projecting flange secured to the lower end of said tubular member, and insulating material arranged within the space between said members and between said bottom member and bottom of said cup member.

3. A drinking vessel of the class described comprising in combination an inner cup member of metal, an outer open-ended tubular member of heat non-conducting material enclosing said cup member, a rim formed integral with the upper end of said cup member and secured to and enclosing the upper end of said tubular member, granular insulating material completely filling the space between said members, a disk of insulating material arranged against the bottom of said cup member for confining said granular material in place, and a metallic bottom piece closing the lower end of said tubular member and provided with an upwardly extending rim for enclosing and attaching to the lower edge of said tubular member.

4. A drinking mug comprising an outwardly flared inner cup member of metal having its upper end terminating in an outwardly and downwardly presented rim, an outer non-metallic tubular member enclosing said inner member and arranged in spaced relation therewith, a bottom piece secured to the lower end of said outer tubular member in spaced-apart relation with the bottom of said inner member, heat non-absorbent material arranged within the space between said members, the upper end of said outer member extending into and being secured to the rim of said inner member, whereby the rim of the mug is of the same temperature as the cup containing the liquid, and means for cementing the joint between said outer member and said rim.

PHIL J. WERBER.
JOHN C. SAMPSON.